United States Patent
Kelly et al.

(10) Patent No.: US 12,519,313 B2
(45) Date of Patent: Jan. 6, 2026

(54) DISPATCHABLE DATACENTRE ENERGY SYSTEM AND A METHOD OF OPERATION

(71) Applicant: FORGE PROCESS SYSTEMS LIMITED, Limerick (IE)

(72) Inventors: Colin Kelly, Limerick (IE); Steven Budge, Porthcaw (GB)

(73) Assignee: FORGE PROCESS SYSTEMS LIMITED, Limrick (IE)

( * ) Notice: Subject to any disclaimer, the term of this patent is extended or adjusted under 35 U.S.C. 154(b) by 164 days.

(21) Appl. No.: 18/555,627

(22) PCT Filed: Apr. 16, 2021

(86) PCT No.: PCT/EP2021/059979
§ 371 (c)(1),
(2) Date: Oct. 16, 2023

(87) PCT Pub. No.: WO2022/218551
PCT Pub. Date: Oct. 20, 2022

(65) Prior Publication Data
US 2024/0213781 A1 Jun. 27, 2024

(51) Int. Cl.
*H02J 3/32* (2006.01)
*H02J 3/00* (2006.01)
(Continued)

(52) U.S. Cl.
CPC ............. *H02J 3/32* (2013.01); *H02J 3/003* (2020.01); *H02J 3/004* (2020.01); *H02J 3/144* (2020.01);
(Continued)

(58) Field of Classification Search
CPC .... H02J 3/32; H02J 3/003; H02J 3/004; H02J 3/144; H02J 3/381; H02J 9/062;
(Continued)

(56) References Cited

U.S. PATENT DOCUMENTS 8,588,989 B1  11/2013 Heath et al.
9,287,710 B2 *  3/2016 Talkin ............... H02J 3/144
(Continued)

FOREIGN PATENT DOCUMENTS

WO  2021/016068 A1  1/2021

OTHER PUBLICATIONS

International Search Report and Written Opinion dated Jan. 14, 2022 which was issued in connection with PCT/EP2021/059979.

*Primary Examiner* — Richard Tan
(74) *Attorney, Agent, or Firm* — Buckley, Maschoff & Talwalkar LLC

(57) ABSTRACT

A dispatchable datacentre energy system is provided. The system comprises a power conditioning system for providing conditioned power to a datacentre; wherein the power conditioning system includes a primary battery system for providing a primary energy reserve to the datacentre and being available to supply power to a grid operably connected to the datacentre in response to a dispatch request from a grid operator. A secondary battery system provides a secondary energy reserve to the datacentre and being available to supply power to the grid in response to the dispatch request. A power generation system provides a third energy reserve to the datacentre and being available to supply power to the grid in response to the dispatch request. A controller is provided for predicting grid conditions and being configured for selectively controlling at least one of the primary battery system; the secondary battery system and the power generation system in response to the predicted grid conditions; and wherein the controller is responsive to the dispatch request to adjust power consumption of the datacentre from the grid or power supply from at least one of the primary battery system, the secondary battery system and the power generation to the grid.

37 Claims, 11 Drawing Sheets

(51) Int. Cl.
*H02J 3/14* (2006.01)
*H02J 3/38* (2006.01)
*H02J 9/06* (2006.01)

(52) U.S. Cl.
CPC .............. *H02J 3/381* (2013.01); *H02J 9/062* (2013.01); *H02J 9/068* (2020.01); *H02J 2203/10* (2020.01); *H02J 2300/10* (2020.01); *H02J 2310/16* (2020.01); *H02J 2310/60* (2020.01)

(58) Field of Classification Search
CPC .... H02J 9/068; H02J 2203/10; H02J 2300/10; H02J 2310/16; H02J 2310/60; H02J 3/14; G06F 1/26; H05K 7/1492
USPC .......................................................... 307/66
See application file for complete search history.

(56) References Cited

U.S. PATENT DOCUMENTS

| | | | |
|---|---|---|---|
| 2011/0187197 A1* | 8/2011 | Moth | H02J 9/062 307/66 |
| 2013/0054987 A1 | 2/2013 | Pfeiffer et al. | |
| 2013/0086404 A1 | 4/2013 | Sankar et al. | |
| 2013/0328395 A1 | 12/2013 | Krizman et al. | |
| 2018/0052431 A1 | 2/2018 | Shaikh et al. | |
| 2021/0004035 A1 | 1/2021 | Yang et al. | |

\* cited by examiner

DISPATCHABLE DATACENTRE ENERGY SYSTEM AND A METHOD OF OPERATION

The present invention is a 371 of International Application No. PCT/EP2021/059979, filed on Apr. 16, 2021, incorporated by reference herein in its entirety.

FIELD OF THE INVENTION

The present invention relates to a dispatchable datacentre energy system. In particular but not exclusively; the dispatchable datacentre energy system is operable to supply power to the grid in response to a dispatch request.

BACKGROUND OF THE INVENTION

An Electrical Grid (Grid) is an interconnected network for delivering electricity from producers to consumers over a transmission system. To ensure a safe reliable system, the System Operator (SO) maintains a continuous (second-by-second) balance between electricity supply from producers and demand from consumers. The SO achieves this by determining the optimal combination of generating stations and reserve providers for each market trading period, managing any contingent events that cause the balance between supply and demand to be disrupted.

The Grid will transition to producing most of its electricity from renewable energy which is a variable and non-synchronous source. The proportion of renewable energy that can be safely and reliably integrated on the grid is dependent on the characteristics of the Operating Reserves—dispatchable (dependable) sources that are available to balance the variability and contingency of the system. Traditionally these reserves are mainly provided by thermal generators that require to run at low loads to be in a position to react to the variability quickly.

Datacentres comprise a network of computer servers typically used by organizations for the remote storage, processing, or distribution of large amounts of data. Conventional datacentres are simple consumers of Electricity with backup systems that ensure their own security of supply in the event of a grid failure. They have reached scales of consumption comparable to power stations and their deployment outpaces the development of generation and transmission on the Grid.

It is thus desirable to provide an energy system for a datacentre which addresses at least some of the drawbacks of the prior art.

SUMMARY OF THE INVENTION

According to a first aspect of the invention there is provided a dispatchable datacentre energy system comprising:
  a power conditioning system for providing conditioned power to a datacentre; wherein the power conditioning system includes a primary battery system for providing a primary energy reserve to the datacentre and being available to supply power to a grid operably connected to the datacentre in response to a dispatch request from a grid operator;
  a secondary battery system for providing a secondary energy reserve to the datacentre and being available to supply power to the grid in response to the dispatch request;
  a power generation system for providing a third energy reserve to the datacentre and being available to supply power to the grid in response to the dispatch request; and
  a controller for predicting grid conditions and being configured for selectively controlling at least one of the primary battery system; the secondary battery system and the power generation system in response to the predicted grid conditions; and wherein the controller is responsive to the dispatch request to adjust
    power consumption of the datacentre from the grid or
    power supply from at least one of the primary battery system, the secondary battery system and the power generation to the grid.

In one embodiment; in the power conditioning system is operably coupled to a first group of devices of the datacentre which require an uninterruptable power supply.

In another embodiment; the secondary battery system is operably coupled to a second group of devices of the datacentre which do not require an uninterruptable power supply.

In a further embodiment; the power conditioning system is selectively coupled to the grid for receiving power or supplying power thereto.

In another embodiment; the secondary battery system is selectively coupled to the grid for receiving power or supplying power thereto.

In one embodiment; the power generation system is selectively coupled to at least one of the power conditioning system; the secondary battery system and the grid.

In an exemplary embodiment; the controller is configured for selectively operating the energy system in one of a power conditioning mode; an off grid mode; and a grid support mode; wherein in the power conditioning mode the power conditioning system is activated, in the off grid mode the power generation system is activated; and in the grid support mode power supply to the grid or power consumption from the grid is controlled in response to a request. Advantageously; the controller is responsive to grid conditions for determining which one of the power conditioning mode; the off grid mode; and grid support mode to select.

In one embodiment; the controller is operable to predict grid conditions in real-time or by using a historical data set.

In another embodiment; the controller is operable to communicate with external data sources for facilitating grid conditions predictions. Advantageously; the external sources comprises at least one of weather forecasts, electricity market data, fuel market data, cloud activity data, and social event data.

In one embodiment; the controller is operable to change modes in real-time.

In another embodiment; the controller is communicable with the grid operator.

In a further embodiment; the controller is configured to indicate to the grid operator a first period when operating in an off grid mode.

In another embodiment; the controller is configured to indicate to the grid operator a second period when operating in a grid support mode.

In an exemplary embodiment; the controller is configured to receive a request from the grid operator to operate in one of the power conditioning mode; the off grid mode; and the grid support mode.

In a further embodiment; the controller is operable to modify at least one of the power conditioning mode; the off grid mode; and grid support mode in response to the grid operator.

In one embodiment; the power conditioning system comprises a parallel array of uninterrupted power supply, UPS, systems.

In another embodiment; each UPS system has an associated UPS battery which forms part of the primary battery system. Advantageously; in power conditioning mode the power conditioning system is configured to condition the power in accordance with UPS classification IEC62040-3 VI SS 111.

In one exemplary embodiment; in the off grid mode; the power conditioning system opens an input circuit breaker to provide all the load requirements from the primary battery system.

In another embodiment; in the grid support mode; the controller receives a request from the grid operator to inject power to the grid or absorb power from the grid.

In one embodiment; the primary battery system and/or the secondary battery system are configured to charge during periods when renewable energy supply to the grid satisfies a predetermined threshold.

In another embodiment; the primary battery system and/or the secondary battery system are configured to discharge during periods when renewable energy supply to the grid satisfies a predetermined threshold.

In a further embodiment; the power generation system comprises a plurality of gas engines. Advantageously; the plurality of gas engines are operable to generate electricity in excess of the datacentre load requirements. Preferably; the plurality of gas engines consists of N+1 units, where, N is the number of units to exceed the datacentre load requirements. In one example; the plurality of gas engines are provided by 6×4.5 MW engines that are operable to load in less than 5.5 minutes.

In another embodiment; each gas engine drives a corresponding generator that produces power that is delivered to a corresponding generator ring main unit (RMU). Advantageously; each RMU is coupled to a pair of generator switchboards which in turn supply the a main switchboard. Preferably; each switchboard is coupled to a step-up voltage transformer.

In a further embodiment; if the controller is notified of a failure event off grid mode is activated and the plurality of gas engines are activated. Advantageously; the controller actives the required number of gas engines. Preferably; the controller switches the supply from the secondary battery system to the activated gas engines after a predetermined time period has elapsed.

In an exemplary embodiment; if a gas engine fails the remaining gas engines are configured to generate the additional load to make up the short fall of the failed gas engine.

The present disclosure further relates to a method of operating a dispatchable datacentre energy system; the method comprising:

providing a power conditioning system for providing conditioned power to a datacentre; wherein the power conditioning system includes a primary battery system for providing a primary energy reserve to the datacentre and being available to supply power to a grid operably connected to the datacentre in response to a dispatch request from a grid operator;

providing a secondary battery system for providing a secondary energy reserve to the datacentre and being available to supply power to the grid in response to the dispatch request;

providing a power generation system for providing a third energy reserve to the datacentre and being available to supply power to the grid in response to the dispatch request; and providing a controller for predicting grid conditions and being configured for selectively controlling at least one of the primary battery system; the secondary battery system and the power generation system in response to the predicted grid conditions; and wherein the controller is responsive to the dispatch request from a grid operator to adjust power consumption of the datacentre from the grid; or power supply from at least one of the primary battery system, the secondary battery system and the power generation to the grid.

Furthermore, the present disclosure relates to a datacentre comprising a dispatchable datacentre energy system which comprises:

a power conditioning system for providing conditioned power to a datacentre; wherein the power conditioning system includes a primary battery system for providing a primary energy reserve to the datacentre and being available to supply power to a grid operably connected to the datacentre in response to a dispatch request from a grid operator;

a secondary battery system for providing a secondary energy reserve to the datacentre and being available to supply power to the grid in response to the dispatch request;

a power generation system for providing a third energy reserve to the datacentre and being available to supply power to the grid in response to the dispatch request; and a controller for predicting grid conditions and being configured for selectively controlling at least one of the primary battery system; the secondary battery system and the power generation system in response to the predicted grid conditions; and wherein the controller is responsive to the dispatch request to adjust power consumption of the datacentre from the grid or power supply from at least one of the primary battery system,

DETAILED DESCRIPTION OF THE DRAWINGS

The present teaching will now be described with reference to an exemplary energy system for a datacentre. It will be understood that the exemplary system and method is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 1:
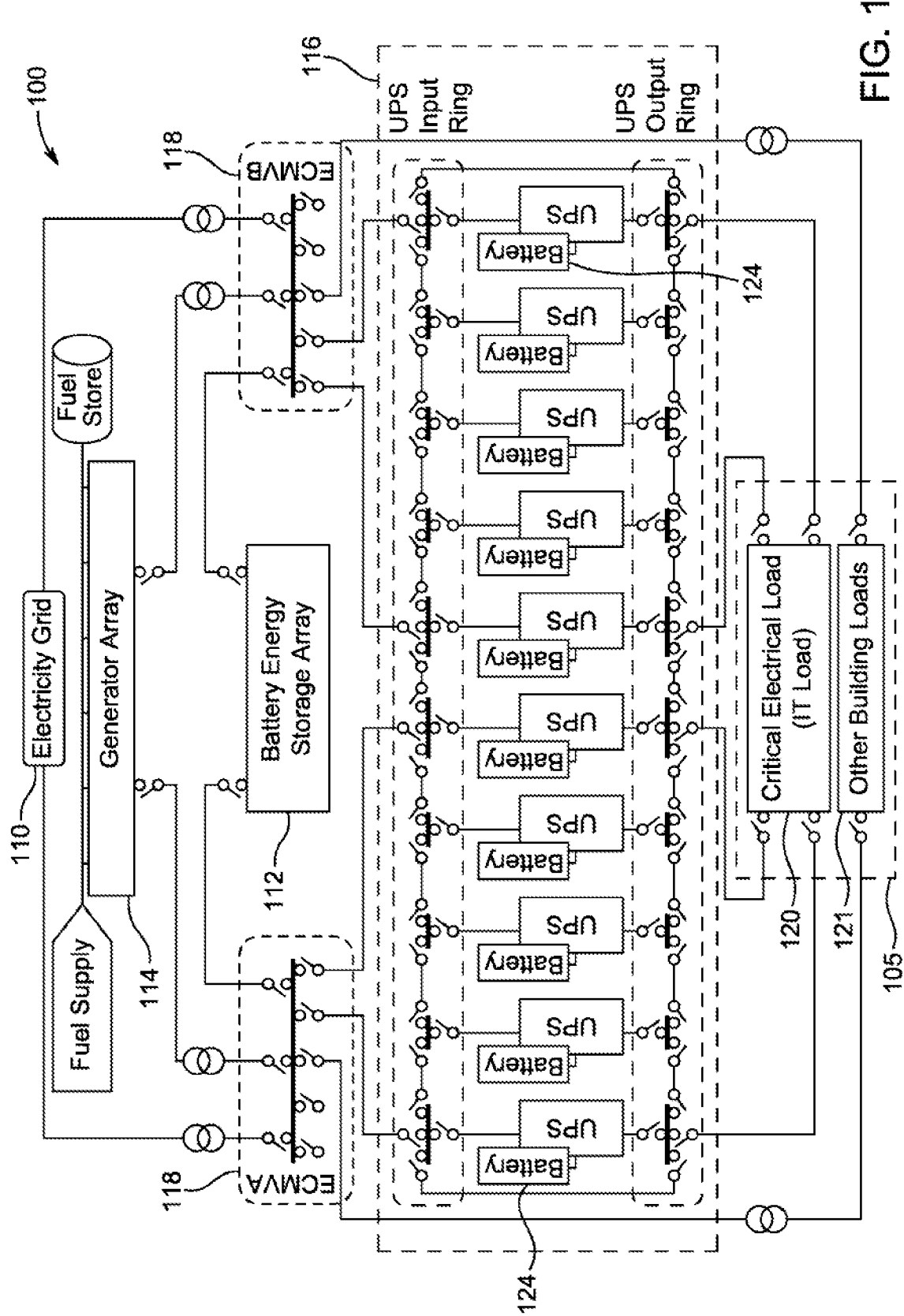
FIG. 1 is a schematic circuit diagram of an energy system for a datacentre according to an embodiment of the present disclosure.
Figure 2:
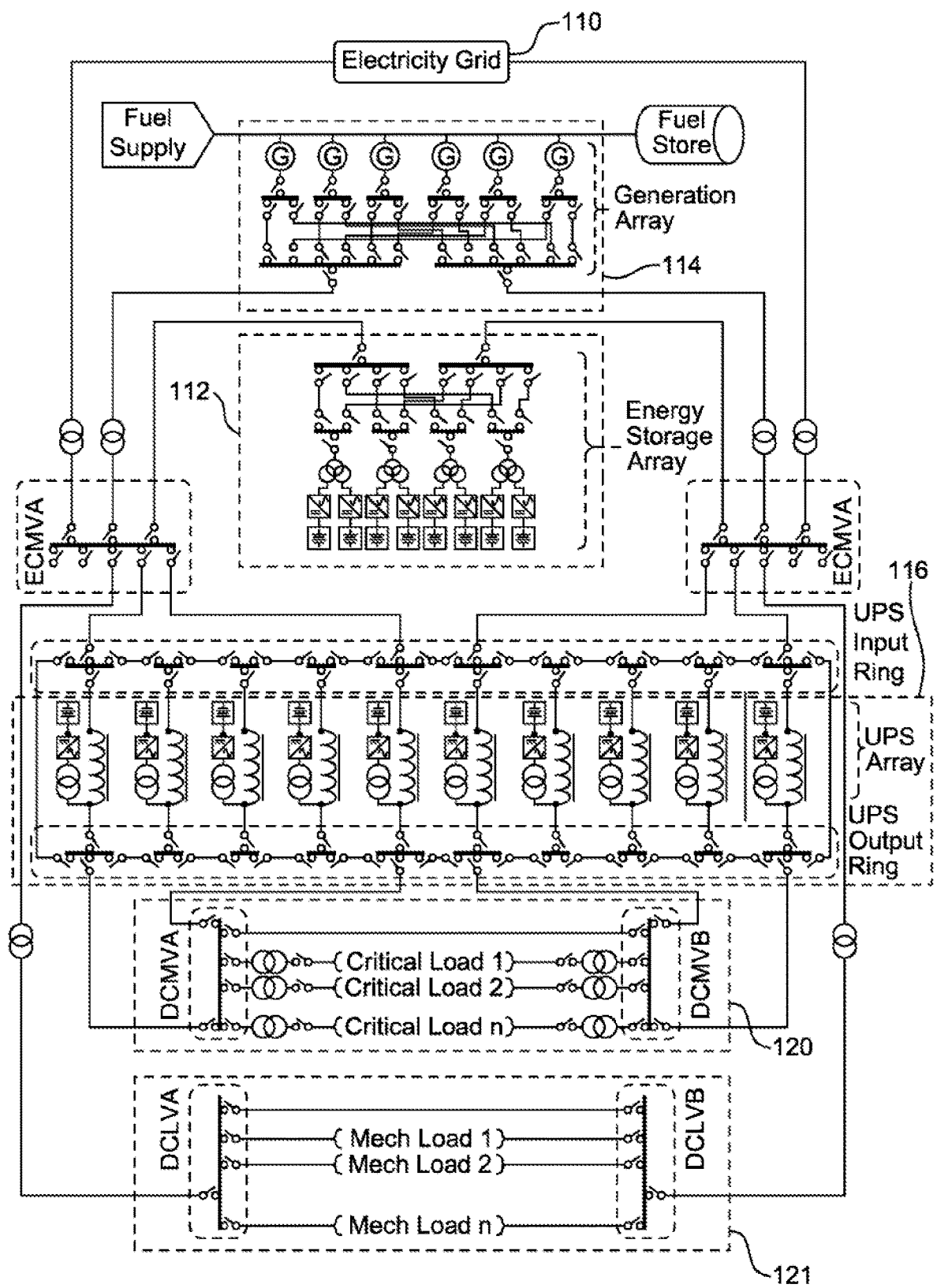
FIG. 2 is another schematic circuit diagram of the energy system of FIG. 1.

Referring to the drawings and initially to FIG. 1 there is illustrated an energy system 100 for a datacentre 105 which allows the datacentre 105 to be a producer of electricity and/or a consumer of electricity from the grid 110. The datacentre 105 is made available for dispatch by a system operator of the electricity grid 110 to consume or produce, more or less energy. For each market trading period, the datacentre 105 will take a position as a producer or consumer depending on the predicted grid conditions, such as scarcity of renewable energy. The datacentre 105 is available to adjust its position (consume/produce, less/more) in real-time by dispatch from the grid. The datacentre may also be relied on by the system operator of the grid as a reserve and system services provider for contingency events. The energy system 100 comprises a battery storage system 112 for providing a primary energy reserve to the datacentre 105. A power conditioning system 116 is provided which is selectively coupled to the battery storage system 112 and is configured for providing conditioned power to a first group of devices of the datacentre in response to an event. In the exemplary embodiment the first group of devices defines a critical (IT) load 120 which may include computer servers of the datacentre 105 but also include other critical devices such as network equipment and security equipment.

A power generation system 114 is provided which is selectively coupled to a second group of devices of the datacentre and/or to the power conditioning system. In the exemplary embodiment; the second group of devices define a mechanical load 121 which may include mechanical, cooling and building equipment. The supply to the mechanical load 121 is not conditioned by the power conditioning system 116. It is however backed up by the Battery Energy Storage System 112. Therefore it may be susceptible to a power interruption of tenths of seconds—the reaction time of the BESS 114. The mechanical load 121 is designed to be able to ride-through momentary power interruptions. There is a conditioned supply to the control systems of the mechanical load 121. In this way the mechanical load 121 does not suffer the losses of running mechanical loads through a power conditioning system as is the case with conventional datacentres.

A controller 118 selectively operates the energy system 100 in one of a power conditioning mode; an off grid mode; and a grid support mode. In the power conditioning mode the power conditioning system 116 is activated. In the off grid mode the power generation system 114 is activated. In the grid support mode power supply from the energy system 100 to the grid 110 or power consumption from the grid 110 to the datacentre 105 is controlled in response to a request.

When the grid 110 has a scarce level of power provided by renewable sources; the datacentre 110 is powered by the battery energy storage system 112. When the grid 110 has a critically level of power, excess power from the battery energy storage system 112 is exported to the grid 110.

The energy centre 100 addresses the need to reduce carbon emissions in datacentre operations. The increasing energy consumption of datacentres is alarming from perspective of a fossil-fueled energy system; where resources are finite and the planet is warming as a result. In the transition to an abundant renewable energy future; interruptible, flexible datacentre loads become valuable. The energy system 100 is a flexible "Grid-Edge" asset compensating power quality and capacity in the electricity network providing a valuable balancing service to the grid 110. Generation, storage and power-conditioning technologies augment the grid-supply to provide conditioned power to the datacentre 105. This results in a datacentre infrastructure that is more sustainable and cost effective, while being more resilient and fault-tolerant. The datacentre 105 is designed to consume electricity when the grid's fuel-mix is predominantly renewable. At peak electricity demand, the grid is most vulnerable and its highest carbon intensity. At these times, the energy system 100 leaves the energy market and supports the datacentre 110 with the power conditioning system 116, the battery energy storage system 112 and the power generation system 114.

The controller 118 comprises an energy and power management system (EPMS) that provides the real time supervision and control of the energy system 100. The EPMS analyses internal and external data sources to forecast the optimal position for each market trading period; while ensuring power availability to the IT load 120 at all times. In the power conditioning mode the power conditioning system 116 provides an uninterruptable power supply (UPS) which provides protection from a broad spectrum of utility events and supplies continuous clean power to the IT load 120. In the off grid mode the datacentre 105 is powered by the battery energy system 112 and the power generation system 114. In the grid support mode the system operator of the grid dispatches the power conditioning system 116 to inject or absorb excess power to/from the grid 110 to respond to grid events.

The energy system 100 is a flexible consumer/producer of electricity, that can respond very quickly to changing circumstances on the grid 110. For a given market period, the energy system 100 will adopt a market position between;

its maximum consumption [operating load+battery charging], and its maximum production [Max Generation/Storage−operating load]

The system operator of the grid 110 can dispatch the energy system 100 to produce or consume more or less power. The system operator can also dispatch the energy system 100 to protect the grid from contingent events. In the exemplary embodiment; the energy system 100 will respond to the system operator's dispatch in tenths-of-seconds. The energy system 100 results in higher levels of protection for the IT load 120. The energy system 100 provides proactive support as opposed to the reactive support as is the case with datacentres know heretofore. It will be appreciated by those skilled in the art that by providing proactive support to the stabilise the grid 110 reduces the probability of grid failure. The energy system 100 may be activated by the grid at earliest opportunity following a detection of a disturbance. The critical load 120 of the datacentre 120 is isolated from the grid 110 as soon as the energy system 100 is activated.

In the case of a resulting failure of the grid 110; the energy system 100 will turn-down supply to match the operating load. Whereas conventional datacentres will only react, at the point of grid failure.

The energy reserves of the energy system 100 are negligibly depleted while responding to a grid failure. This allows the energy system 100 to respond to repeated events over the same time-horizon. Conventional datacentres energy reserves are significantly depleted in activating backup systems making them vulnerable to repeated grid events. The mutual interaction of the grid 110 and the energy system 100 reduces the emissions of the grid and the datacentre load. The battery energy storage system 112 is charged at a time of low demand and high renewable energy availability when renewable energy is abundant. It is discharged back to the load of the datacentre 105 and the grid 110 when renewable energy is scarce. The production efficiency of the generation system 114 together with its low-emission fuel sources allows it to outperform the majority of the other producers on the grid in terms of emissions. The efficient, low-emission characteristics of the energy system 100 allows it to displace producers with higher emissions from the energy market. The grid 110 will become less dependent on fossil fuel generators being online at low-output to provide reserves for contingencies. The grid 110 will be able to depend on its fleet of datacentres 105 to provide the reserve response.

In the exemplary embodiment; the controller 118 is responsive to grid conditions for determining which one of the power conditioning mode; the off grid mode; and grid support mode to select. The controller 118 is operable to predict grid conditions. The controller 118 is operable to communicate with external data sources for facilitating grid conditions predictions. The external sources may include weather forecasts, electricity market data, fuel market data, cloud activity data, and social event data. The controller 118 is operable to change modes in real-time. The controller is communicable with the system operator of the grid 110. For example; the controller 118 is configured to indicate to the system operator a first period when the energy system will be in an off grid mode. In another example; the controller 118 is configured to indicate to the system operator a second period when the energy system will be in a grid support mode. In a further example; the controller 118 is configured to receive a request from the system operator to operate in one of the power conditioning mode; the off grid mode; and the grid support mode. It will be appreciated by those skilled in the art that the controller 118 is operable to modify at least one of the power conditioning mode; the off grid mode; and grid support mode in response to the system operator. The energy system 100 is configured to supply electricity to at least two groups of devices of the datacentre 105. In one example; the groups of devices comprises a first group of critical devices 120 and a second group of non-critical devices 121. The first group is operably coupled to the power conditioning system 116. The second group is operably coupled to the battery storage system 112.

In an exemplary embodiment; the power conditioning system 116 comprises a parallel array of uninterrupted power supply, UPS, systems. Each UPS system has an associated UPS battery 124. In the power conditioning mode the power conditioning system 116 is configured to condition the power in accordance with UPS classification IEC62040-3 VI SS 111. In the off grid mode; the power conditioning system 116 opens an input circuit breaker to provide all the load requirements from the UPS battery system. In the grid support mode; the controller 118 receives a request from the system operator of the grid 110 to inject power to the grid 110 or absorb power from the grid 110. The battery energy system 112 is configured to charge during periods when renewable energy supply to the grid is above a predetermined threshold. The battery energy system 112 is configured to discharge during periods when renewable energy supply to the grid 110 is below a predetermined threshold. In the exemplary embodiment; the power generation system 114 comprises a plurality of gas engines. The gas engines are operable to generate electricity in excess of the datacentre load requirements. The plurality of gas engines consists of N+1 units, where, N is the number of units to exceed the datacentre load requirements. In a non limiting example; the plurality of gas engines are provided by 6×4.5 MW engines that are operable to load in less than 5.5 minutes. Each gas engine drives a corresponding generator that produces power that is delivered to a corresponding generator ring main unit (RMU). Each RMU is coupled to a pair of generator switchboards which in turn supply the main ECMVA and ECMVB Switchboards. Each of the generator switchboards are coupled to a transformer step-up the voltage. If the controller 118 is notified of a failure event; the energy system 100 may be operated in off grid mode and the plurality of gas engines are activated. The controller 118 is configured to active the required number of gas engines. The controller 118 switches the supply from the battery energy system to the activated gas engines after a predetermined time period has elapsed. If a gas engine fails the remaining gas engines are configured to generate the additional load to make up the short fall of the failed gas engine.

Figure 3:
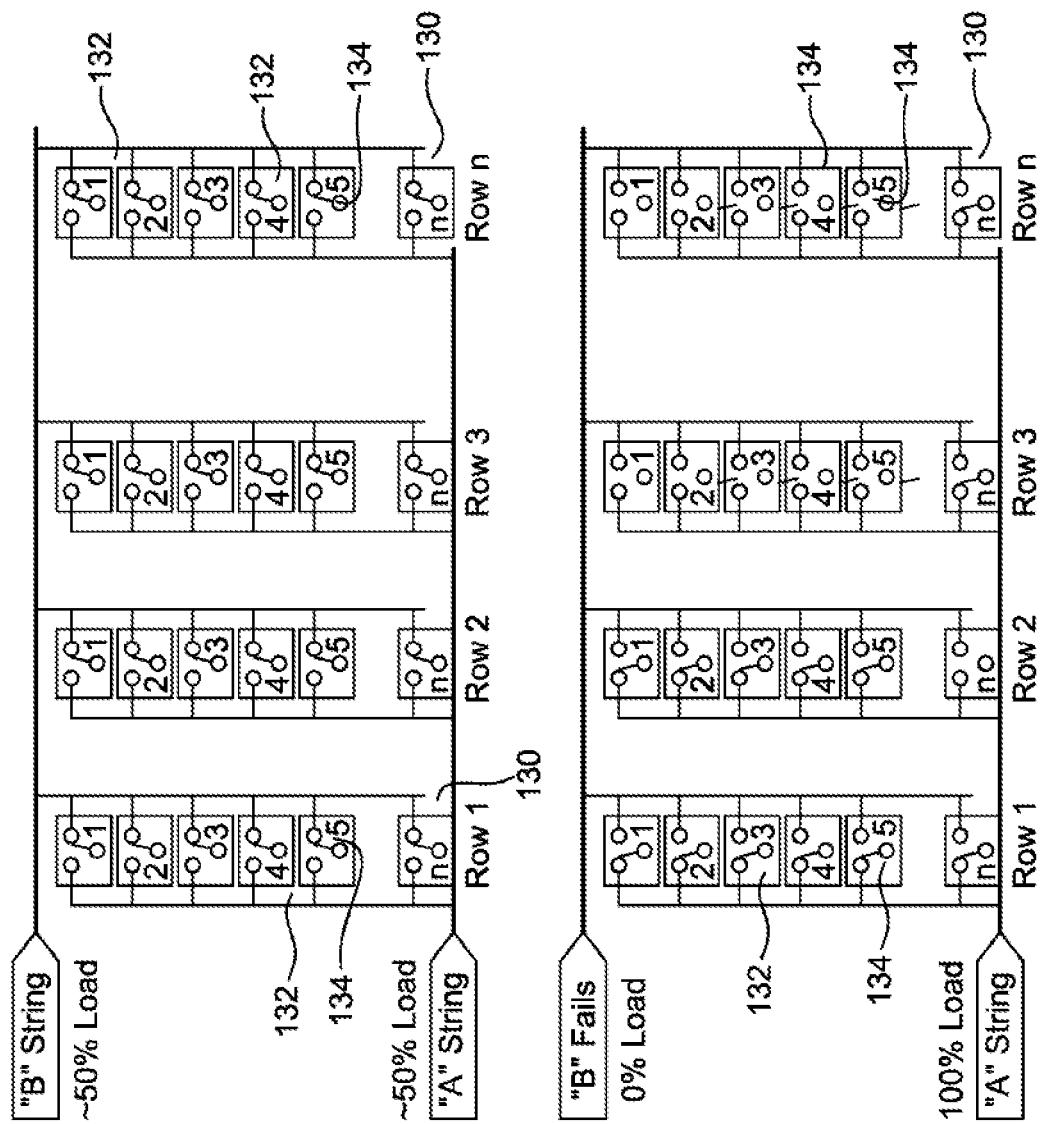
FIG. 3 is a schematic circuit diagram of a detail of the energy system of FIG. 1.

Referring to FIG. 3; the electricity is distributed to IT load 120 over fault-tolerant and concurrently maintainable electrical distribution system. The IT load 120 is configured as n-Rows 130 of n-Racks 132 in each served from "Strings" A and B. Each Rack 132 has a transfer switch 134 to automatically switch over to the alternative power string in the event of a loss of supply from that string. The racks 132 are setup to normally draw power from either the A-side String or the B-Side String which balances the load. (A~50%; B~50%). Where there is a power failure on either side, the transfer switch in those racks that have lost power will flip over to the draw power from the opposite side. This transfers 100% of load to the remaining live String.

Figure 4:
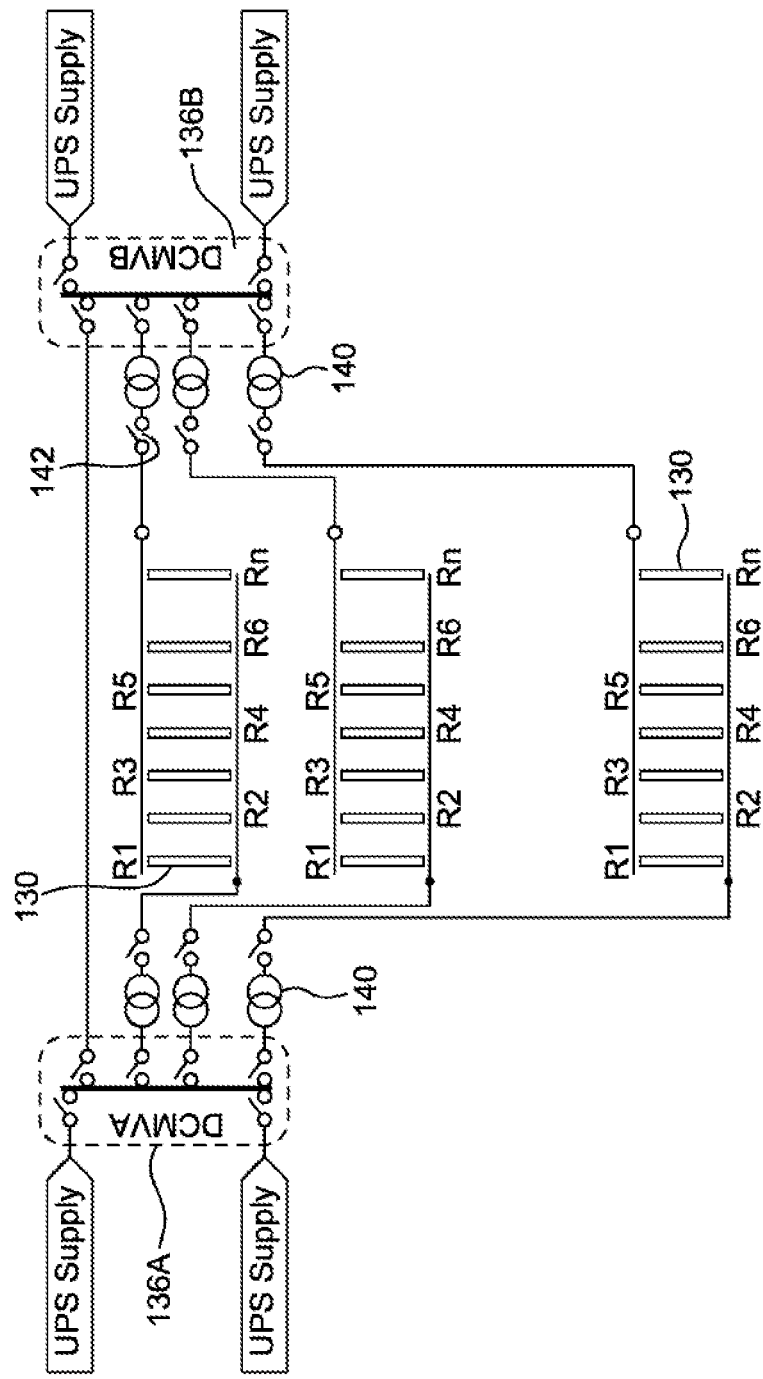
FIG. 4 is a schematic circuit diagram of a detail of the energy system of FIG. 1.

Referring to FIG. 4 which illustrates each String being fed from each of two Datacentre Medium Voltage Switchboards (DCMVA and DCMVB) 136A, 136B and converted to low-voltage by a 20 k V/400V transformer 140 with a low voltage switch. In normal operation; each of the DCMV boards 136A, 136B and transformers 140 operate at 50% load. Where there is a failure of the transformer 140, LV Switch 142 or the outgoing LV cable failure on either side, the load transfers to the corresponding string on the opposite side of the IT Load Block. DCMV A/B Switchboard Failure the load transfers to the opposite DCMV Board and ½ the Datacentre is affected. Incoming MV Cable Failure, the load transfers as above and the DCMV Boards can be Buscoupled until the cable failure is resolved. IT Load 120 is fed at 3 ph, 20 KV, 50 Hz from the UPS Output Ring over multiple cables to the Main IT Switchboards of the Datacentre (DCMVA & DCMVB).

Figure 5:
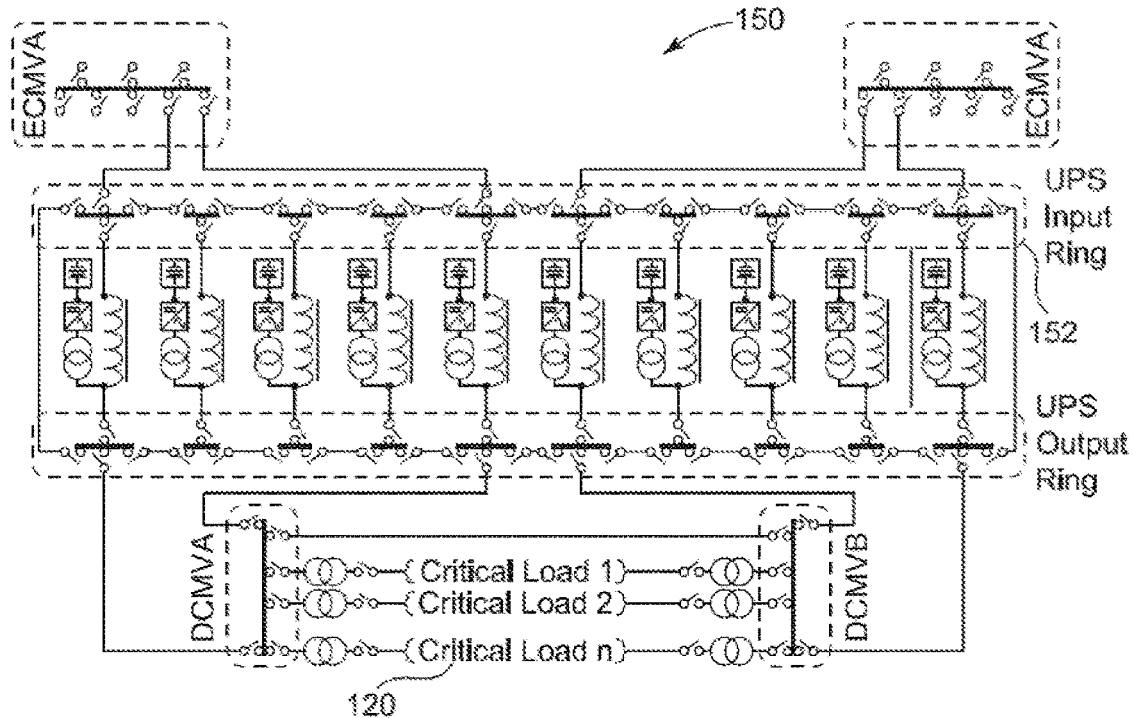
FIG. 5 is a schematic circuit diagram of a detail of the energy system of FIG. 1.

The datacentre 105 is supplied with A and B power supplies to serve the mechanical, cooling and building Loads (Mech Loads 121). These 20 KV Supplies are transformed to 400V to supply the Datacentre Low Voltage Main Switchboards (DCLVA & DCLVB) as can be seen in FIG. 5. It should be noted that the mechanical supply is not conditioned by the UPS. It is however backed up by the battery energy storage system 112. Therefore it is susceptible to a power interruption of tenths of seconds the reaction time of the BESS 112. The mechanical loads 121 is designed to take account of this and will be able to ride-through the interruption. There will be a UPS Backed supply to the control systems of the mechanical devices. In this way the mechanical load does not suffer the losses of running mechanical loads 121 through a UPS as is the case with conventional datacentres.

Critical equipment of the datacentre 105 such as cooling devices will generally receive two supplies from A & B Strings in a similar way to the IT Equipment. Each of the DCLV boards and transformers operate at 50% load in a similar way to that described, where each of the cooling units has dual supplies from A and B with a transfer switch. Where there is a failure on Outgoing LV Cable failure on either side, the load transfers to the corresponding set on the opposite side for the affected portion of the mechanical load. Where there is a failure on DCLV Switch Board, the load transfers to the opposite DCLV Board and ½ the Mechanical Load of the Datacentre is affected. Where there is a failure on Transformer or Incoming MV Cable Failure, the load transfers as above and the DCMV Boards can be Buscoupled until the cable or Tx Failure is resolved.

Load-side power is conditioned through a parallel array of UPS Systems, each having a dedicated UPS Battery system 124 with short autonomy. It provides protection from a broad spectrum of utility voltage events and supplies continuous clean power to the protected IT load 120. MVUPS provides instantaneous response to grid events and plays a valuable role in grid services from frequency response to voltage regulation. It provides a key blending function for the energy centre as it transitions between power sources, isolating the protected IT load Referring to FIG. 5 which illustrates an exemplary schematic arrangement of the UPS Array 150 with UPS Units arranges as a parallel array of 2.25 MW units which operate at 20 k V with an efficiency of 98%. The array consists of N+1 units where N is the total design IT Load. The UPS Array is fed from the UPS Input Ring of RMU's 152 (Ringmain Units). The UPS Supply ring between ECMVA and ECMVB is never fully closed and can only be reconfigured on a break-before-make basis. The conditioned power from the UPS System is fed to the datacentre 105 over four cables from a similar Ring of RMU's. In the case of a shut-down of one of the units, the remaining nine share the load and the failed unit is isolated by reconfiguring the Input and Output Rings. Where one of the RMUs fails, the ring is similarly reconfigured. The UPS Units have Impedance (Z) Isolated Static Converter (ZISC) architecture which is based on an isolating line reactor coupled with high-performance power converters. Decoupled from the utility via the isolating line reactor, the power converters continuously condition and filter utility disturbances, such as harmonics and voltage imbalance, without cycling the energy storage. Load related events, such as downstream faults and other dynamic reactive current demands, are managed with ZISCs high overload capability. The isolating line reactor and the coupling transformer are applied at medium voltage, whereas the power converters and energy storage are at low voltage, simplifying maintenance. The Battery Energy Storage System 112 that supports the UPS may be a premium Lithium-Ion Battery selected for its superior charge and discharge performance, energy density, capacity retention and calendar/cycle life. Each UPS Unit is supported by a number of strings of Batteries providing an appropriate duration (~30 Secs-~5 mins range) of autonomy at full load.

Figure 6:
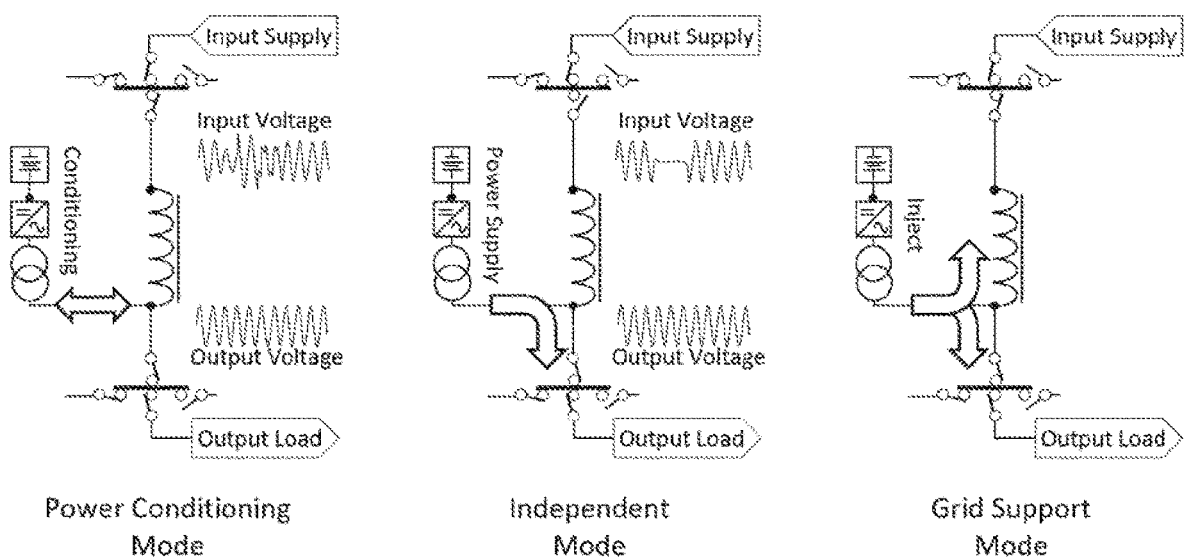
FIG. 6 is a schematic circuit diagram of a detail of the energy system of FIG. 1.

Referring to FIG. 6; it will be appreciated by those skilled in the art that in power conditioning mode the UPS spends most of the time supplying continuously regulated voltage, irrespective of utility conditions, where the high-performance power electronic inverters ensure that the output voltage is regulated for combinations of input supply voltage disturbances. During power conditioning mode the power converters can control the real and reactive power from the utility to the load, without cycling the energy storage. At the same time the UPS is continuously conditioning and filtering any utility disturbances, providing reactive current support to the critical loads in the instance of a voltage sag event or swell occurring. The resulting performance is continuous clean power in accordance with IEC62040-3 VISS 111, with efficiency greater than 98% for the load spectrum from 50% up to rated full load and the ability to supply high fault currents for downstream protection. In off grid mode; the UPS opens the input circuit breaker to provide all the load requirements from the energy storage. If the utility power is no longer available or a prolonged sag event, the UPS opens its input breaker and seamlessly transfers the load to the UPS Battery System 124, operating now in independent mode. The UPS Battery System allows ride-through time for either the utility power to be restored or the BESS system 112 to engage the load. The fast handoff to the BES 112 preserves the autonomy of the UPS Battery System 124. In grid support mode, the controller receives a dispatch from the grid operator to inject or absorb power. The UPS System changes the phase angle across the isolating line reactor to supply the requested power demand while ensuring that the output voltage stays at its nominal level. When the demanded power from the Grid exceeds the datacentre load, the UPS injects the power to support the load but also injects the excess capacity to the grid 110. Where there is a request from the grid operator to absorb power, the phase angle is changed on the isolating line reactor to keep the output voltage at nominal value and the power is absorbed by the UPS Battery system.

Figure 7:
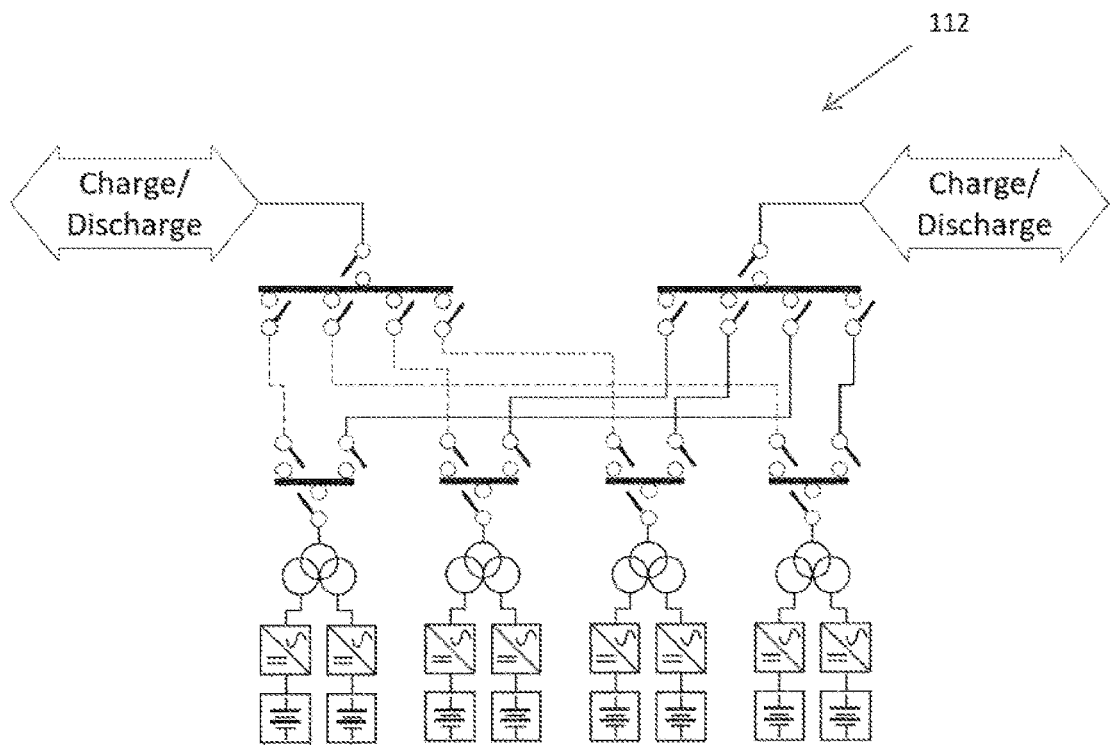
FIG. 7 is a schematic circuit diagram of a detail of the energy system of FIG. 1.

Referring to FIG. 7 which illustrates an exemplary Battery Energy Storage System (BES) 112 which acts as the primary energy reserve for the datacentre 105—replacing conventional diesel generators. It is available to load in <200 ms and can provide all grid services (except SIR) making it a valuable resource for both the datacentre and grid stability. In the exemplary arrangement; lithium-ion Battery modules 160 are mounted in racks of trays providing a suitable KWh per rack operating between 800-1100 VDC. Each energy system has a sufficient number of racks to provide power (MW) in excess of the design IT load and which can be sustained for a number of hours (autonomy) at a normal discharge rate. There is a multi-level Battery Management System (BMS) which at;

tray level, manages voltage, temperature and executes cell balancing rack level, manages total voltage, current and executes protection functions master level, manages the rack units and communicates with the Invertor.

Inverter units are served by groups of racks on the DC side and coupled to a medium voltage transformer on the AC side. Inverters have their own protection devices including DC load-break switches, overvoltage protection and circuit breakers. The Inverter performs grid management functions including active and reactive power adjustments to deliver grid stability services. Inverters can be coupled individually or in pairs (as shown in FIG. 7) to a Transformer which steps up the voltage to match the Energy system. Transformers are coupled to Ring Main Units which connects them to each of the Battery Switchboards on either side of the ECMV Switchboards. This configuration for the BES 112 to connect to either or both ECMV boards facilitates Fault Tolerance and concurrent maintainability. The BES Control system has redundant master controllers with serial or ethernet bus interface with the EPMS (IEC61850 or Modbus). Critical signals are hard wired to the EPMS System. It provides data on the available capacity of the BES Array as a whole and accepts aggregated setpoints (e.g. power output) from the EPMS. The BESS Control system is set to operate in Grid Supporting Mode (accepts dynamic Power/Quality (P/Q) setpoints) or Grid Forming Mode (Accepts fixed voltage and frequency setpoints). There is a short interruption to switch between modes of approximately 20 secs which is carried by the UPS. The BES Array plays a key role in load protection. Once an event is detected, such as the UPS switching to independent mode, the primary reserve—BES, is called to discharge. As soon as the BES has engaged the load (<200 ms), the UPS sees power restored and reverts to its normal Power Conditioning Mode with preserving the autonomy of the UPS Battery. At the same time, the Generator array is also called to start and will be ready to load some few minutes later. The BES Array will gradually transfer the load to the Generator Array over a period of time according to the load step/acceptance characteristics of the Generator Array. The entire transfer of the load from the UPS 116 to the BES 112 to the Generator 114 will take approximately 6 mins and preserve the autonomy of both the BES and the UPS for further Grid Events should they arise.

The topology of the BES array is fault tolerant and concurrently maintainable as follows:
 a. Tray Failure, Rack Failure, DC Rack Cable Failure will have a negligible effect and is dealt with by the Rack BMS.
 b. Invertor Failure creates a power deficit which can be made-up by maximising the discharge rate and further relying on the UPS to provide power until the generators have engaged the load. (ditto for Invertor to Transformer Cable, or Transformer Winding Failure)
 c. Transformer Failure creates a larger power deficit and is similarly handled by maximising battery discharge and making up the balance with the UPS until the Generators have engaged the load (ditto for RMU or RMU Cable Failure).
 d. In the case of a BES Switchboard Failure Load is transferred to the opposite BES Switchboard (Ditto for Cable Failure between BES Switchboard and ECMV board).

The BES Array plays a central role in supporting the grid 105. It receives an aggregated setpoint from the EPMS/Grid Controller and generates individual set-points for each inverter based on State of Charge (SoC) of battery blocks. In this way it regulates the invertor output depending on the behaviour of the Frequency of the Grid and controls the State of Charge (SoC) of the batteries—interfacing with the Battery Management System. The system reacts and rises to a non-zero setpoint within <200 ms of a frequency deviation reaching the Reserve Trigger.

The BES 112 will normally operate by charging during the night when demand is low and renewable energy is typically curtailed, and discharging this energy when renewable energy is scarce at peak times of Grid Consumption. By time-shifting energy consumption (energy arbitrage), the datacentre 105 can avoid peak emissions from the grid 110. This is advantageous for the Grid because the datacentre removing its demand, removes the need to the grid to dispatch high-emission producers into the energy market.

Figure 8:
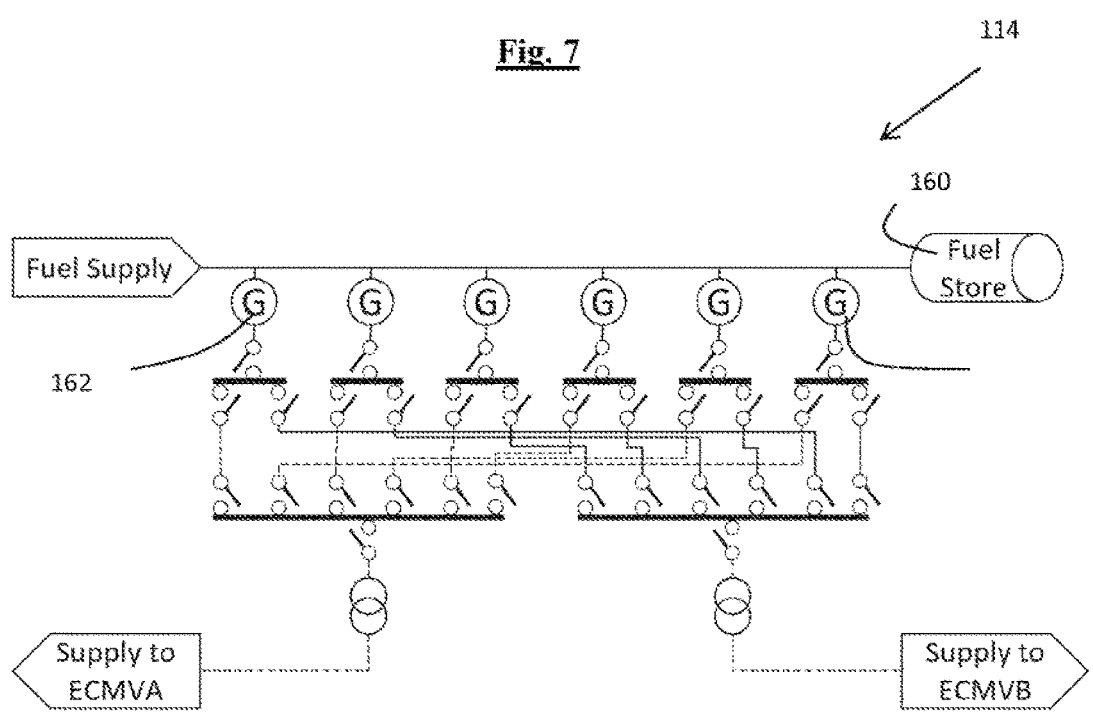
FIG. 8 is a schematic circuit diagram of a detail of the energy system of FIG. 1.

Referring to FIG. 8 an exemplary generator 114 is illustrated. In the example arrangement, a local fuel source 160 is provided from which electricity can be generated for longer-term security of supply of datacentre operations. It will be appreciated by those skilled in the art as the world make the energy transition, security of supply will become more front-of-mind for both datacentre operations and the grid itself. To minimise the effect this could have on the environment, datacentres have to make choices around the fuel type and why/when one would dispatch the engines. Gas Reciprocating Engines 162 are currently the best available technology that combine fast-start, flexible operation, and compatibility with low-emission fuels such as BioMethane and Hydrogen. Replacing the diesel emissions of conventional datacenters with natural gas is already a major step forward but as Biomethane and Hydrogen become more widely available the load can transition to even cleaner sources of energy for security of supply. These engines 162 can ultimately be replaced by other fueled electricity sources such as Hydrogen fuel cells as technologies mature. The Generation Array is sized to generate electricity in excess of the datacentre design load and consists of N+1 units, where, N is the number of units to exceed the design load. The preferred embodiment is for 6×4.5 MW Engines 162 that are ready to load in less than 5.5 minutes. Each reciprocating engine drives a generator that produces power at 11 KV which is delivered to a Generator Ring Main Unit (RMU). Each Generator RMU is coupled to each of the Generator Switchboards that, in turn supply the main ECMVA and ECMVB Switchboards. This configuration allow Generators to supply either or both ECMV boards allowing for concurrent maintenance/fault tolerance of the system. Each of the two main Generator switchboards are coupled to a Transformer step-up the voltage in sync with the rest of the energy centre at 20 KV. The Generator Array is controlled by redundant master controllers with serial or ethernet bus interface with the EPMS (IEC61850 or Modbus). Critical signals are hard wired to the EPMS System. It provides data on the available capacity and accepts aggregated setpoints (e.g. power output) from the EPMS. The Generator Array Control system is set to operate in Grid Supporting Mode (accepts dynamic (P/Q) setpoints) or Grid Forming Mode (Accepts fixed voltage and frequency setpoints). The generator system can switch seamlessly between these modes. The Generator Array Control system has supervision and control of the Genset, auxiliary and fuel systems, including all breakers (Except ECMV Feeder breakers). It controls the engines Start/stop, regulation, synchronisation, and all protection functions. Fuel reserves are provided from local gas storage and a transmission connection to the utility gas network. The fuel storage distribution systems are fully redundant, fault tolerant and concurrently maintainable. Generator Array operation for load protection. When the UPS registers a failure event and goes to off grid mode, the Generator Array is called to start and support the operating load. The Generator master controller starts the required number of engines ($N^{Operating}+1$). Once the generators are synchronised and ready to load, the BES array begins handing-off the load to the Generator Array over a period of a couple of minutes.

Where there is a failure of an engine during operation, the remaining engines will share the additional load. (ditto for Generator RMU or Generator RMU Cable Failure). Where there is a failure of a main generator board, the load will be transferred to the opposite main switchboard. (ditto for a Generator Transformer or Cable failure). The preserved autonomy in the UPS and BESS array remain available for the additional protection of the datacentre load. The Generator Array has capability to deliver a wide range of Grid services while it is in operation. From a cold-start it can begin delivering services from 5.5 minutes. The Generation Array can sustain generation for as long as it has available fuel reserves.

Figure 9:
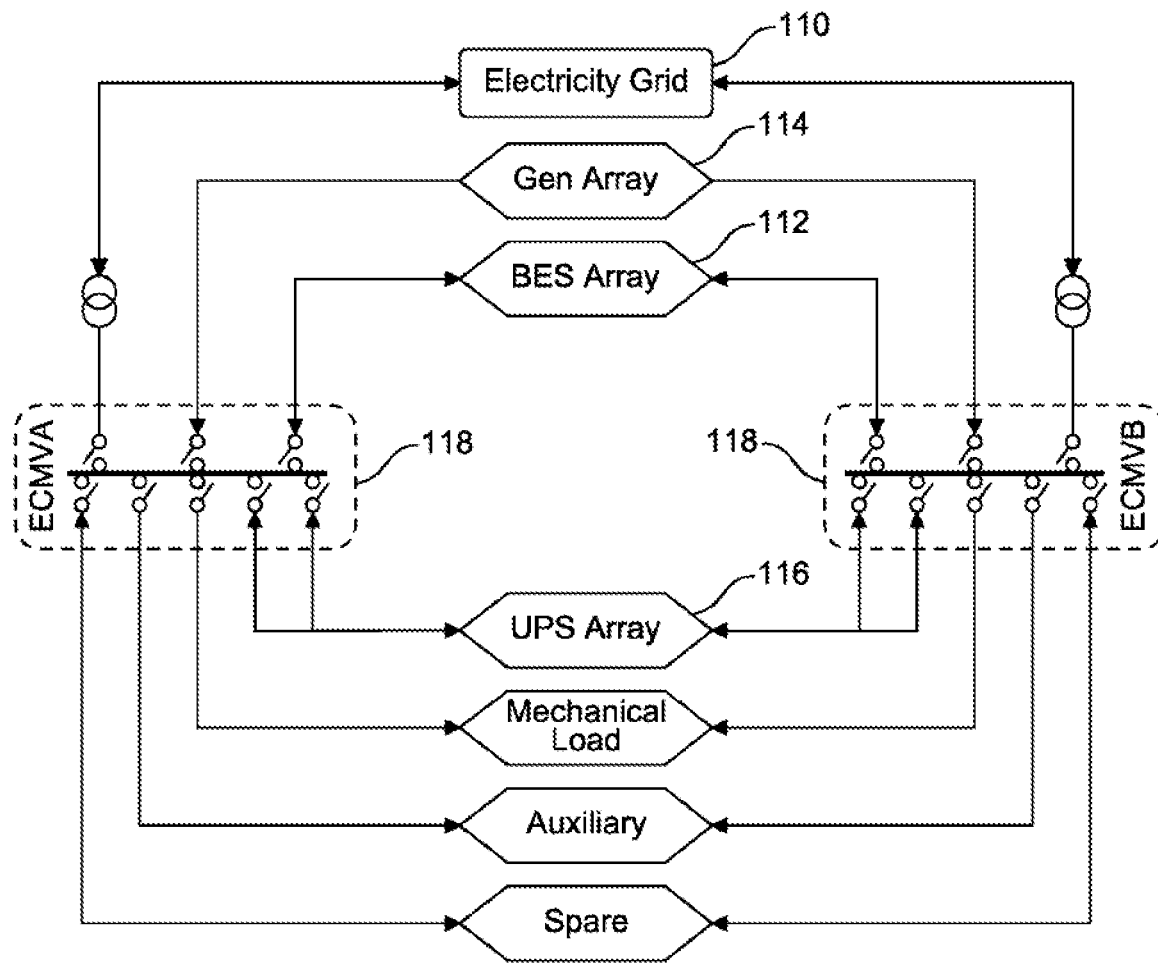
FIG. 9 is a schematic circuit diagram of a detail of the energy system of FIG. 1.

Referring to FIG. 9 which illustrates the exemplary dispatchable datacentre energy system 100. Each dispatchable datacentre energy system has a pair of Grid (HV/MV) transformers (Tx) that are located in a common "Customer Substation" yard. This yard will be adjacent to the Grids HV Substation and house the control and protection systems for the grid interface. The yard will be separately secured in compliance with HV regulations. The HV Side of each Grid Tx is the Point of Connection (PoC) through which energy is exported or imported and metered. The Energy Centre Medium Voltage Switchboards (ECMVA & ECMVB) select the incoming energy supply from the Grid, BES Array or GEN Array and supply the UPS Array and Mechanical Loads in parallel. In the event of a Switchboard or Cable Failure on either side the load is transferred to the opposite ECMV board. The arrows in the Figure denote the potential energy flow combinations of the Energy Centre as it shifts from consumption to production and export.

Figure 10:
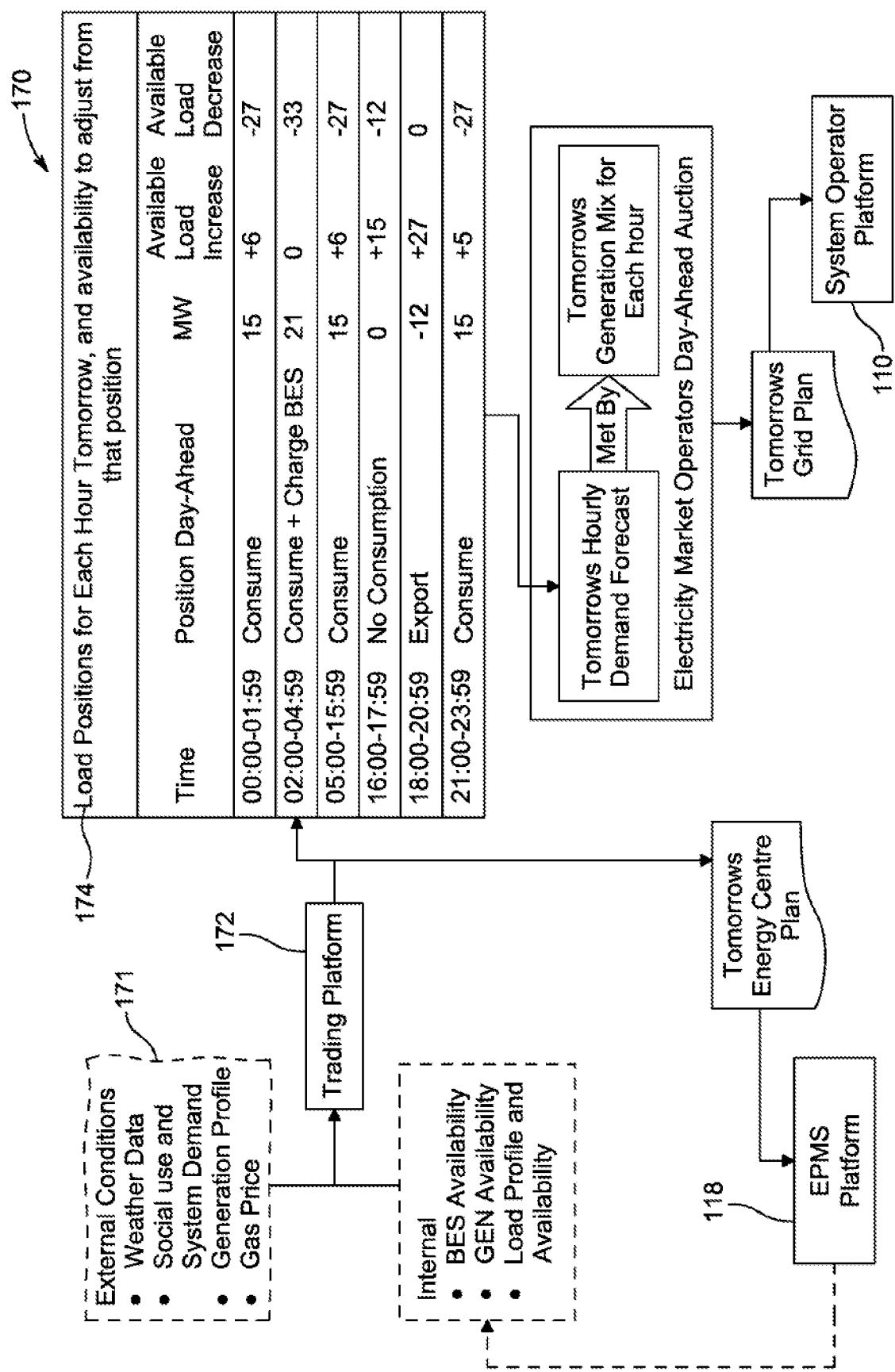
FIG. 10 is a block diagram of a detail of the energy system of FIG. 1

Referring to FIG. 10 which illustrates an exemplary Energy and Power Management System (EPMS) 170 is the overarching SCADA system for the electrical generation and distribution system within the energy system 100. As such, the EPMS 170 provides functionalities traditionally split between a Power Management System, which is typically responsible for real-time supervision and sequencing, and an Energy Management System, which is typically responsible for measurement and power quality archiving. This single harmonized EPMS platform offer a board range of functionalities:

a. Operator interface for the real time supervision and control of the network
b. Archiving, display and report generation of alarms, events, and measurement history
c. Data aggregator and gateway to external supervision and control systems
d. Automatic sequencing to manage the transition between operation scenarios
e. Commercial optimization of the BES charging behaviour
f. Flexibility forecasting for the commercial exploitation of the generation assets The internal data for the EPMS 170 is collected from the protection relays, UPS controllers, UPS Battery Management Systems (UPS BMS), the BES master controllers, the Genset master controllers and remote I/O modules (RTUs) through a redundant ethernet network. The data is then archived, leveraged for logic operations or optimization algorithms, and displayed via redundant sets of servers located in physically separate cabinets. The operator can view and control the electrical infrastructure on touch screen panels located in the EPMS network cabinets or, more ergonomically, from a workstation located in the control room. In addition, a remote access system has been included in the concept to enable supervision and control of the energy centre from other locations.

Data may be collected from a wide range of external sources including weather forecasts, electricity market data, fuel market data, cloud activity data, social event data to provide the intelligence to predict the dispatch of the energy centre to protect the load and serve the grid.

Energy System Operation.
Day-Ahead Plan.

The Trading Platform 172 polls domestic and international datasets 171 such as weather, social use, generator availability, currency, fuel prices; as well as the internal availability factors from the EPMS and uses algorithms to optimise the use of the energy centre in tomorrows energy market. This is summarised in a table 174 of information that is posted to the Electricity Market Operators' Day-Ahead Auction indicating the volumes to be imported/exported to/from the energy centre for each market period of the following day. The table 174 also confirms to the grid 110, the extent to which, the energy system 100 is available adjust its position in any of those market periods. This is commonly known as a physical notification to the balancing market. This process enables the grid 110 to select the optimum set of generation assets to supply the demand in each market period in accordance with its market design. In general, lowest price generation bids are successively accepted until the volume of demand is met for a given market period. The last successful bid is known as the price-setter for the period. For each period that the energy system 100 wishes to export power, its bid must be successful in in the Day-Ahead auction. Once the auction results are known, the Energy system 100 has its Run-Plan for the following day.

Real-Time Operation

Figure 11:
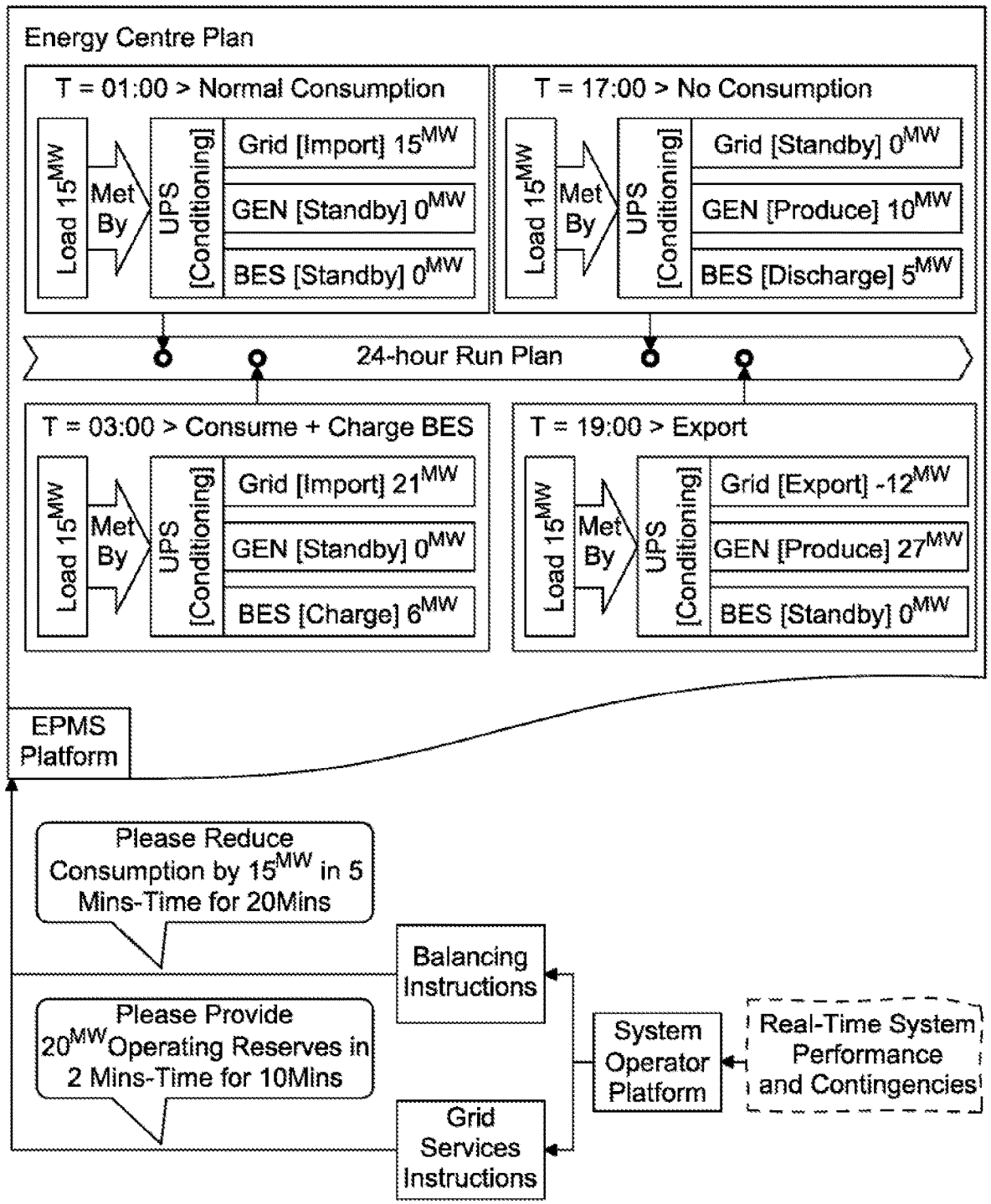
FIG. 11 is a block diagram of a detail of the energy system of FIG. 1

Referring now to FIG. 11; the EPMS 118 manages the network and instructs the BES and GEN Master Controllers to produce/consume power according to the scheduled run-plan. The grid System Operator monitors the operation of the system including contingencies. Where a generator reneges on its production commitment (lower-wind than expected for example) the system operator (SO) of the grid 110 must take a balancing action and selects a provider from its balancing market to make up the deficit of power. Where a power surplus occurs in the Balancing Market, the SO can instruct a generator to turn-down or a demand side unit to increase consumption. Separate to it Balancing Market, the SO has contracted with a fleet of grid services providers to provide a range of frequency and voltage stabilisation services which can be dispatched directly by the SO. The EPMS receives Balancing or Grid Services Instructions from the SO and optimises the various assets (UPS, BES, GEN) to provide the necessary response from the Energy system 100. The Programmed response of the EPMS depends on the Energy system status at the time the instruction is received as well as the nature of the instruction. For example, GEN might deliver a response if it was running at the time, otherwise it might be delivered by BES. In general, the battery systems (UPS and BES) would be deployed for fast, short-term response to absorb or supply power whereas GEN would be used for longer duration support to the Grid.

Figure 12:
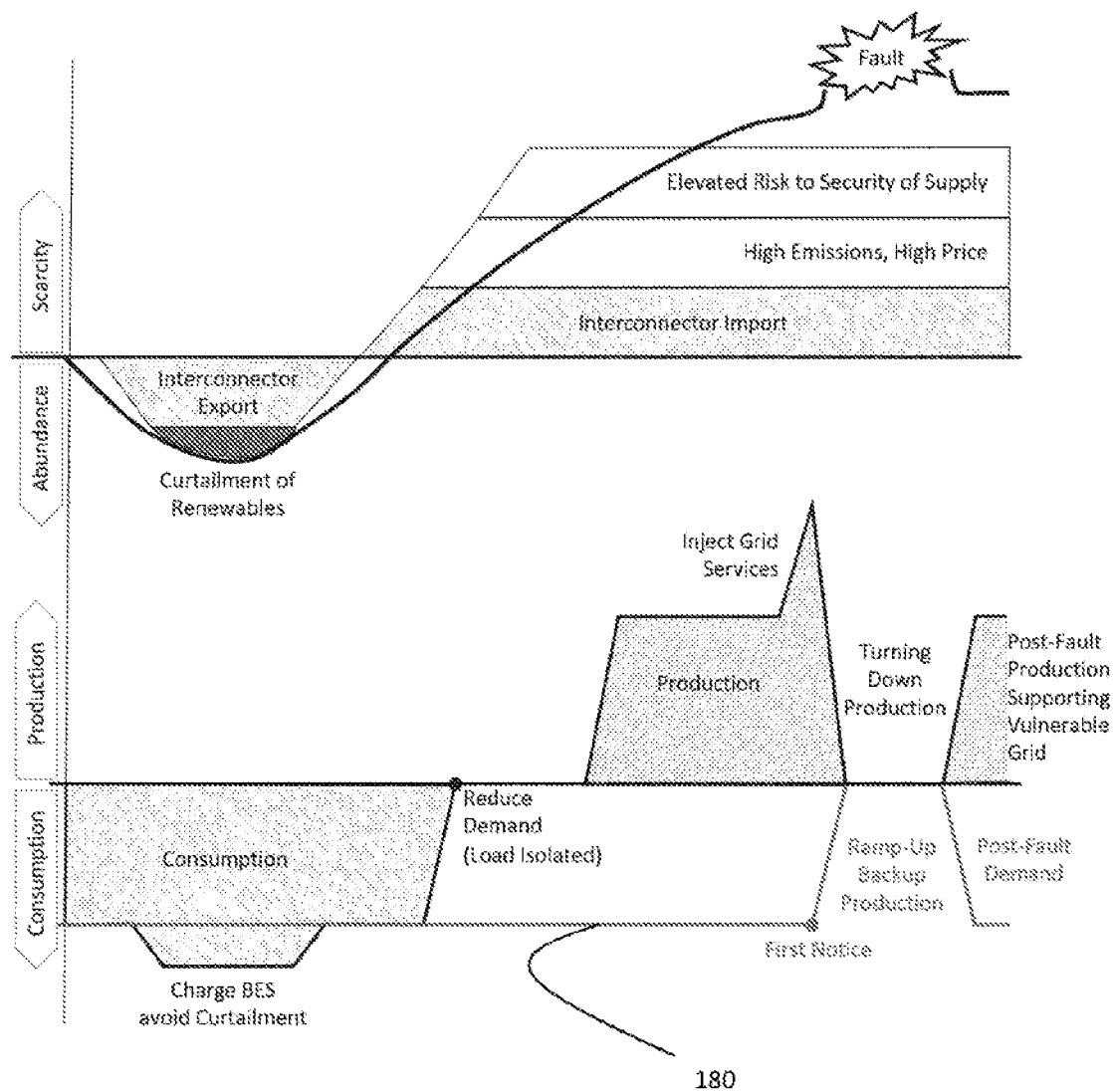
FIG. 12 is an exemplary graph illustrating details of the energy system of FIG. 1 in operation.

Referring to FIG. 12; the combined operation of the Energy system 100 with its Datacentre load when compared to the prior art of Conventional Datacentre is illustrated. The illustration at the top shows the grid cycling from a period of abundance to scarcity, culminating in a critical scarcity and then a fault. The illustration at the bottom shows the response of the Energy system 100 with its datacentre load as it adjusts its consumption, production and grid services in response to what is happening on the grid 110. It compares this response to that of a conventional, demand-only datacentre illustrated by the line 180 on graph. At times of abundance, the grid 110 has more renewable energy than it can deal with for systematic reasons and once it has maximised the export capacity of its interconnectors to other jurisdictions it curtails or spills this energy from the system. During these periods of abundance energy is cheap, with low emissions and the grid 110 has a high capacity to be able to deal with contingent events from this position. The energy system 100 moves to a position of maximum consumption to charge its batteries 112, 124 during this period. As the grid moves to a position of scarcity and it is importing as much as it can from interconnected jurisdictions, the price of energy together with its associated emissions are rising. The grid becomes more constrained to deal with contingencies. During these periods, the energy system 100 reduces consumption taking pressure off the grid 110 and providing additional protection to the datacentre load. In this case the Energy system 100 is the prime supplier of the datacentre load and the grid is in-reserve. Also the emissions of the datacentre load are capped at the local emissions of the energy centre and it is not exposed to the higher grid emissions. When energy is critically scarce the Energy system 100 exports is excess power to the grid 110. If there was to be an event on the grid, the Energy system 100 would provide frequency and voltage stabilisation to the grid 110. In the subsequent failure scenario resulting from the event, the Energy system 100 would be turning-down its production to match the load. Once the grid 110 has been restored after the fault, the Energy system 100 would resume production in support of a vulnerable grid.

In contrast, a conventional demand-only, datacentre illustrated by the line 180, has a flat consumption profile only reacts when the fault occurs and needs to ramp up production from its backup reserves. When the grid 110 is restored following the fault—the conventional datacentres are typically configured to lump load to the grid immediately on restoration which will again put maximum pressure on a grid 110 that is recovering from the fault in extreme weather conditions or whatever were the mitigating circumstances of the fault.

It will be appreciated by those skilled in the art that a dispatchable datacentre energy system 100 is disclosed. In operation; the energy system 100 is dispatchable as it can supply power to the grid 110 on demand at the request of the grid operators, according to market needs. The energy system 100 can adjust its power output according to an order. A power conditioning system 116 provides conditioned power to the datacentre 105. In the exemplary arrangement, the power conditioning system 116 includes a primary battery system 124 for providing a primary energy reserve to the datacentre and being available to supply power to a grid 110 in response to a dispatch request from a grid operator. A secondary battery system 112 provides a secondary energy reserve to the datacentre 105 and is available to supply power to the grid 110 in response to the dispatch request. A power generation system 114 provides a third energy reserve to the datacentre 105 and is available to supply power to the grid 110 in response to the dispatch request. The controller 118 predicts grid conditions and is configured for selectively controlling at least one of the primary battery system 124; the secondary 112 battery system and the power generation system 114 in response to the predicted grid conditions. In the exemplary arrangement; the controller 118 is responsive to the dispatch request to adjust power consumption of the datacentre 105 from the grid 110 or power supply from at least one of the primary battery system 124, the secondary battery system 112 and the power generation 114 to the grid 110. The power conditioning system 116 is operably coupled to a first group of devices 120 of the datacentre which require an uninterruptable power supply. The secondary battery system 112 is operably coupled to a second group of devices 121 of the datacentre 105 which do not require an uninterruptable power supply. The power conditioning system 116 is selectively coupled to the grid 110 for receiving power or supplying power thereto. The secondary battery system 112 is selectively coupled to the grid 110 for receiving power or supplying power thereto. The power generation system 116 is selectively coupled to at least one of the power conditioning system 116; the secondary 112 battery system and the grid 110.

The controller 118 is configured for selectively operating the energy system 100 in one of a power conditioning mode; an off grid mode; and a grid support mode. In the power conditioning mode the power conditioning system 116 is activated, in the off grid mode the power generation system 114 is activated; and in the grid support mode power supply to the grid 110 or power consumption from the grid 110 is controlled in response to a request. The controller 118 is responsive to grid conditions for determining which one of the power conditioning mode; the off grid mode; and grid support mode to select. The controller 118 is operable to predict grid conditions in real-time or by using a historical data set. The controller 118 is operable to communicate with external data sources for facilitating grid conditions predictions. The external sources comprises at least one of weather forecasts, electricity market data, fuel market data, cloud activity data, and social event data. The controller 118 is operable to change modes in real-time. The controller 118 is communicable with the grid operator.

The controller 118 is configured to indicate to the grid operator a first period when the operating in an off grid mode. The controller 118 is configured to indicate to the grid operator a second period when operating in a grid support mode. The controller 118 is configured to receive a request from the grid operator to operate in one of the power conditioning mode; the off grid mode; and the grid support mode. The controller 118 is operable to modify at least one of the power conditioning mode; the off grid mode; and grid support mode in response to the grid operator. The power conditioning system comprises a parallel array of uninterrupted power supply, UPS, systems. Each UPS system has an associated UPS battery which forms part of the primary battery system. In power conditioning mode the power conditioning system is configured to condition the power in accordance with UPS classification IEC62040-3 VI SS 111. In the off grid mode; the power conditioning system opens an input circuit breaker to provide all the load requirements from the primary battery system. In the grid support mode; the controller 118 receives a request from the grid operator to inject power to the grid or absorb power from the grid.

The primary battery system 124 and/or the secondary battery system 112 are configured to charge during periods when renewable energy supply to the grid 110 satisfies a predetermined threshold. The primary battery system 124 and/or the secondary battery system 112 are configured to discharge during periods when renewable energy supply to the grid 110 satisfies a predetermined threshold. The power generation system 114 may comprise a plurality of gas engines. The plurality of gas engines are operable to generate electricity in excess of the datacentre load requirements. In the exemplary embodiment; the plurality of gas engines consists of N+1 units, where, N is the number of units to exceed the datacentre load requirements. In a non-limiting example; the plurality of gas engines are provided by 6×4.5 MW engines that are operable to load in less than 5.5 minutes. Each gas engine drives a corresponding generator that produces power that is delivered to a corresponding generator ring main unit (RMU). Each RMU is coupled to a pair of generator switchboards which in turn supply the a main switchboard. Each switchboard is coupled to a step-up voltage transformer. If the controller 118 is notified of a failure event off grid mode is activated and the plurality of gas engines are activated. The controller 118 actives the required number of gas engines. The controller 118 switches the supply from the secondary battery system 112 to the activated gas engines after a predetermined time period has elapsed. If a gas engine fails the remaining gas engines are configured to generate the additional load to make up the short fall of the failed gas engine.

Figure 13:
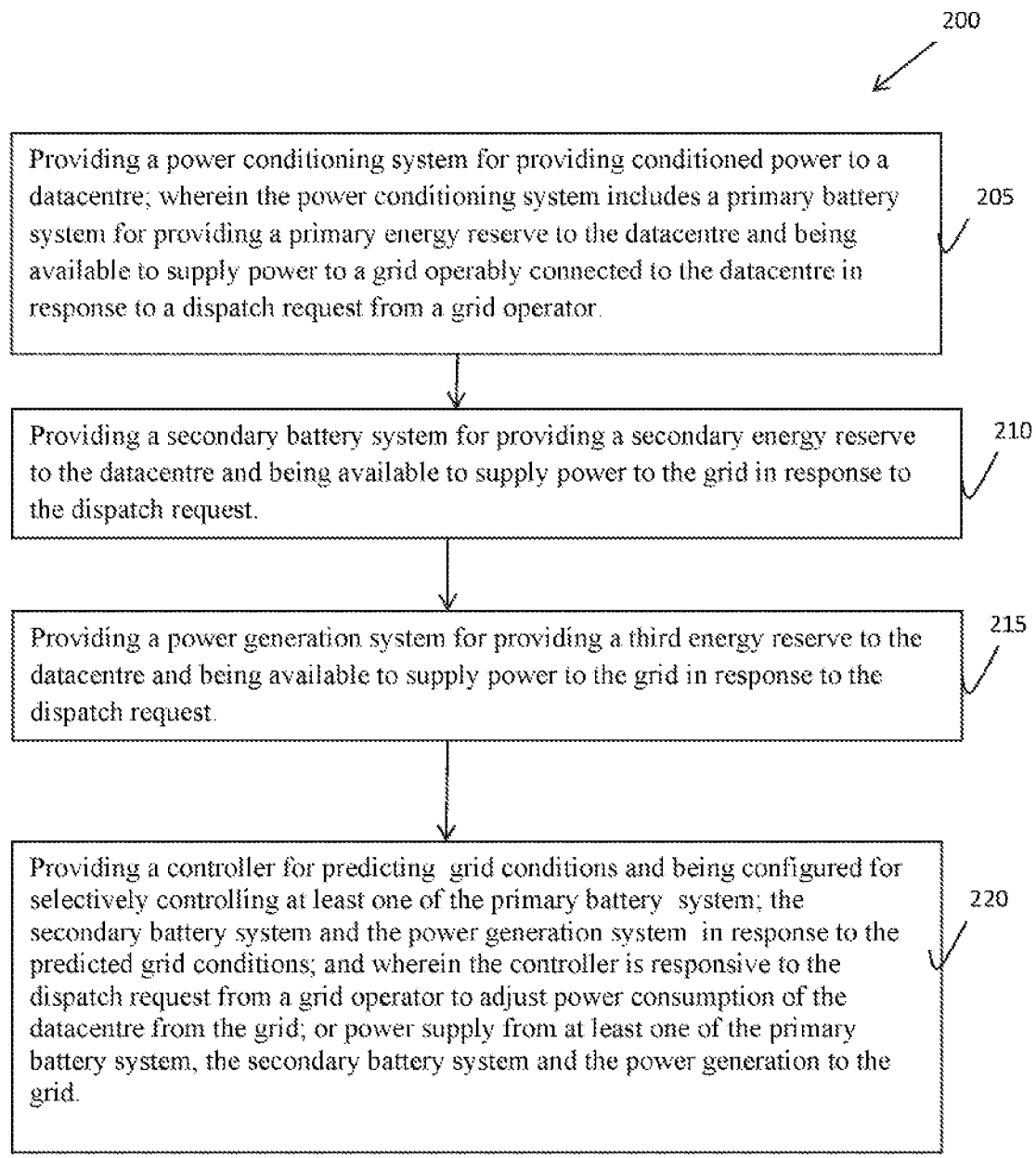
FIG. 13 is an exemplary flowchart detailing exemplary steps of operating a dispatchable datacentre energy system.

Referring to the flowchart 200 of FIG. 13 which illustrates exemplary step of operating a dispatchable datacentre energy system 100. In step 205; a power conditioning system 116 is provided for providing conditioned power to a datacentre 105; wherein the power conditioning system 116 includes a primary battery system 124 for providing a primary energy reserve to the datacentre 105 and being available to supply power to a grid 110 operably connected to the datacentre 105 in response to a dispatch request from a grid operator. In step 210; a secondary battery system is provided for providing a secondary energy reserve to the datacentre 105 and being available to supply power to the grid 110 in response to the dispatch request. In step 215; a power generation system 114 is provided for providing a third energy reserve to the datacentre 105 and being available to supply power to the grid 110 in response to the dispatch request. In step 220; a controller 118 is provided for predicting grid conditions and being configured for selectively controlling at least one of the primary battery system 124; the secondary battery system 112 and the power generation system 114 in response to the predicted grid conditions; and wherein the controller 118 is responsive to the dispatch request from a grid operator to adjust power consumption of the datacentre 105 from the grid 110; or power supply from at least one of the primary battery system 124, the secondary battery system 112 and the power generation 114 to the grid 110.

It will be understood that while exemplary features of a dispatchable datacentre energy system 100 is described, that such an arrangement is not to be construed as limiting the invention to such features. The method for operating the dispatchable datacentre 100 may be implemented in software, firmware, hardware, or a combination thereof. In one mode, the method is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method for authorising persons and controlling vehicle parameters such as but not limited to the lock state of the doors and the state of access facilities such as a ramp or lift, or vehicle parameters such as but not limited to temperature. The processor(s) is a hardware device for executing software, particularly software stored in memory. Processor(s) can be any custom made or commercially available processor, a primary processing unit (CPU), an auxiliary processor among several processors associated with a computer, a semiconductor based microprocessor (in the form of a microchip or chip set), a macro-processor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present disclosure may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method.

Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any method descriptions or blocks in the Figures, should be understood as representing modules, segments, or portions of code which include one or more executable instructions for implementing specific logical functions or steps in the process, as would be understood by those having ordinary skill in the art.

The above detailed description of embodiments of the disclosure is not intended to be exhaustive or to limit the disclosure to the exact form disclosed. While specific examples for the disclosure are described above for illustrative purposes, those skilled in the relevant art will recognize various modifications are possible within the scope of the disclosure. For example, while processes and blocks have been demonstrated in a particular order, different implementations may perform routines or employ systems having blocks, in an alternate order, and some processes or blocks may be deleted, supplemented, added, moved, separated, combined, and/or modified to provide different combinations or sub-combinations. Each of these processes or blocks may be implemented in a variety of alternate ways. Also, while processes or blocks are at times shown as being performed in sequence, these processes or blocks may instead be performed or implemented in parallel or may be performed at different times. The results of processes or blocks may be also held in a non-persistent store as a method of increasing throughput and reducing processing requirements.

The invention claimed is:

1. A dispatchable datacentre energy system comprising:
a power conditioning system for providing conditioned power to a datacentre; wherein the power conditioning system includes a primary battery system for providing a primary energy reserve to the datacentre and being available to supply power to a grid operably connected to the datacentre in response to a dispatch request from a grid operator;
a secondary battery system for providing a secondary energy reserve to the datacentre and being available to supply power to the grid in response to the dispatch request;
a power generation system for providing a third energy reserve to the datacentre and being available to supply power to the grid in response to the dispatch request; and
a controller for predicting grid conditions and being configured for selectively controlling at least one of the primary battery system, the secondary battery system and the power generation system in response to the predicted grid conditions; and wherein the controller is responsive to the dispatch request to adjust
power consumption of the datacentre from the grid or
power supply from at least one of the primary battery system, the secondary battery system and the power generation to the grid.

2. The dispatchable datacentre energy system of claim 1, wherein the power conditioning system is operably coupled to a first group of devices of the datacentre which require an uninterruptable power supply.

3. The dispatchable datacentre energy system of claim 1, wherein the secondary battery system is operably coupled to a second group of devices of the datacentre which do not require an uninterruptable power supply.

4. The dispatchable datacentre energy system of claim 1, wherein the power conditioning system is selectively coupled to the grid for receiving power or supplying power thereto.

5. The dispatchable datacentre energy system of claim 1, wherein the secondary battery system is selectively coupled to the grid for receiving power or supplying power thereto.

6. The dispatchable datacentre energy system of claim 1, wherein the power generation system is selectively coupled to at least one of the power conditioning system, the secondary battery system and the grid.

7. The dispatchable datacentre energy system of claim 1, wherein the controller is configured for selectively operating the dispatchable datacentre energy system in one of a power conditioning mode, an off grid mode, and a grid support mode, wherein in the power conditioning mode the power conditioning system is activated, in the off grid mode the power generation system is activated, and in the grid support mode power supply to the grid or power consumption from the grid is controlled in response to a request.

8. The dispatchable datacentre energy system of claim 7, wherein the controller is responsive to grid conditions for determining which one of the power conditioning mode, the off grid mode, and the grid support mode to select.

9. The dispatchable datacentre energy system of claim 1, wherein the controller is operable to predict grid conditions in real-time or by using a historical data set.

10. The dispatchable datacentre energy system of claim 1, wherein the controller is operable to communicate with external data sources for facilitating grid conditions predictions.

11. The dispatchable datacentre energy system of claim 10, wherein the external sources comprises at least one of weather forecasts, electricity market data, fuel market data, cloud activity data, and social event data.

12. The dispatchable datacentre energy system of claim 7, wherein the controller is operable to change modes in real-time.

13. The dispatchable datacentre energy system of claim 7, wherein the controller is communicable with the grid operator.

14. The dispatchable datacentre energy system of claim 13, wherein the controller is configured to indicate to the grid operator a first period when the operating in an off grid mode.

15. The dispatchable datacentre energy system of claim 14, wherein the controller is configured to indicate to the grid operator a second period when operating in a grid support mode.

16. The dispatchable datacentre energy system of claim 13, wherein the controller is configured to receive a request from the grid operator to operate in one of the power conditioning mode, the off grid mode, and the grid support mode.

17. The dispatchable datacentre energy system of claim 16, wherein the controller is operable to modify at least one of the power conditioning mode, the off grid mode, and the grid support mode in response to the grid operator.

18. The dispatchable datacentre energy system of claim 1, wherein the power conditioning system comprises a parallel array of uninterrupted power supply, UPS, systems.

19. The dispatchable datacentre energy system of claim 18, wherein each UPS system has an associated UPS battery which forms part of the primary battery system.

20. The dispatchable datacentre energy system of claim 18, wherein in power conditioning mode the power conditioning system is configured to condition the power in accordance with UPS classification IEC62040-3 VI SS 111.

21. The dispatchable datacentre energy system of claim 13, wherein in the off grid mode; the power conditioning system opens an input circuit breaker to provide load requirements from the primary battery system.

22. The dispatchable datacentre energy system of claim 13, wherein in the grid support mode, the controller receives a request from the grid operator to inject power to the grid or absorb power from the grid.

23. The dispatchable datacentre energy system of claim 1, wherein the primary battery system and/or the secondary battery system are configured to charge during periods when renewable energy supply to the grid satisfies a predetermined threshold.

24. The dispatchable datacentre energy system of claim 23, wherein the primary battery system and/or the secondary battery system are configured to discharge during periods when renewable energy supply to the grid satisfies a predetermined threshold.

25. The dispatchable datacentre energy system of claim 1, wherein the power generation system comprises a plurality of gas engines.

26. The dispatchable datacentre energy system of claim 25, wherein the plurality of gas engines are operable to generate electricity in excess of datacentre load requirements.

27. The dispatchable datacentre energy system of claim 26, wherein the plurality of gas engines consists of N+1 units, where, N is the number of units to exceed the datacentre load requirements.

28. The dispatchable datacentre energy system of claim 27, wherein the plurality of gas engines are provided by six 4.5 MW engines that are operable to load in less than 5.5 minutes.

29. The dispatchable datacentre energy system of claim 26, wherein each gas engine drives a corresponding generator that produces power that is delivered to a corresponding generator ring main unit (RMU).

30. The dispatchable datacentre energy system of claim 29, wherein each RMU is coupled to a pair of generator switchboards, wherein the pair of generator switchboards supply power to a main switchboard.

31. The dispatchable datacentre energy system of claim 30, wherein each switchboard is coupled to a step-up voltage transformer.

32. The dispatchable datacentre energy system of claim 26, wherein if the controller is notified of a failure event off grid mode is activated and the plurality of gas engines are activated.

33. The dispatchable datacentre energy system of claim 32, wherein the controller activates a required number of gas engines.

34. The dispatchable datacentre energy system of claim 33, wherein the controller switches the supply from the secondary battery system to the activated gas engines after a predetermined time period has elapsed.

35. The dispatchable datacentre energy system of claim 34, wherein if a determination is made that one of the required number of gas engines has failed the remaining ones of the required number of gas engines are configured to generate an additional load to make up the short fall of the failed gas engine.

36. A method of operating a dispatchable datacentre energy system, the method comprising:
providing a power conditioning system for providing conditioned power to a datacentre, wherein the power conditioning system includes a primary battery system for providing a primary energy reserve to the datacentre and being available to supply power to a grid operably connected to the datacentre in response to a dispatch request from a grid operator;
providing a secondary battery system for providing a secondary energy reserve to the datacentre and being available to supply power to the grid in response to the dispatch request;
providing a power generation system for providing a third energy reserve to the datacentre and being available to supply power to the grid in response to the dispatch request; and
providing a controller for predicting grid conditions and being configured for selectively controlling at least one of the primary battery system, the secondary battery system and the power generation system in response to the predicted grid conditions, and wherein the controller is responsive to the dispatch request from the grid operator to adjust
power consumption of the datacentre from the grid; or
power supply from at least one of the primary battery system, the secondary battery system and the power generation to the grid.

37. A datacentre comprising the dispatchable datacentre energy system as claimed in claim 1.

* * * * *